United States Patent
Huang et al.

(10) Patent No.: US 9,699,624 B1
(45) Date of Patent: Jul. 4, 2017

(54) ACCESS NETWORK GROUP PAGING FOR END DEVICES

(71) Applicant: Verizon Patent and Licensing Inc., Arlington, VA (US)

(72) Inventors: Ye Huang, San Ramon, CA (US); Lei Song, Fremont, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/215,695

(22) Filed: Jul. 21, 2016

(51) Int. Cl.
*H04W 68/00* (2009.01)
*H04W 4/08* (2009.01)
*H04W 4/00* (2009.01)
*H04W 74/08* (2009.01)
*H04W 72/00* (2009.01)

(52) U.S. Cl.
CPC ............ *H04W 4/08* (2013.01); *H04W 4/005* (2013.01); *H04W 68/005* (2013.01); *H04W 72/005* (2013.01); *H04W 74/0833* (2013.01)

(58) Field of Classification Search
CPC ............... H04W 76/021; H04W 68/02; H04W 74/0833; H04W 72/0446; H04W 64/003; H04W 4/005; H04W 4/12; H04W 4/06; H04W 72/042; H04W 76/023; H04W 4/08; H04W 76/046; H04W 8/005; H04L 45/16; H04L 43/0864
USPC ........ 455/458, 436, 456, 574; 370/252, 329, 370/336, 328
See application file for complete search history.

(56) References Cited

U.S. PATENT DOCUMENTS

| | | | |
|---|---|---|---|
| 2003/0050078 A1* | 3/2003 | Motegi | H04W 60/04 455/456.1 |
| 2014/0256324 A1* | 9/2014 | Mohanty | H04W 4/005 455/436 |

* cited by examiner

*Primary Examiner* — Phuoc H Doan

(57) ABSTRACT

A method, a device, and a non-transitory storage medium provide to generate a paging message that includes a group identifier that identifies a group of end devices to which a paging pertains; broadcast the paging message in response to the generation; start a timer in response to the broadcast of the paging message; generate, in response to a first time interval calculated by the timer, a first message that includes at least one of a sub-group identifier, which identifies a sub-group of the end devices of the group to which the paging pertains, or an individual identifier, which identifies one of the end devices of the group to which the paging pertains, wherein the first message is generated based on a radio access-radio network temporary identifier (RA-RNTI) value; and broadcast the first message in response to the generation of the first message.

20 Claims, 13 Drawing Sheets

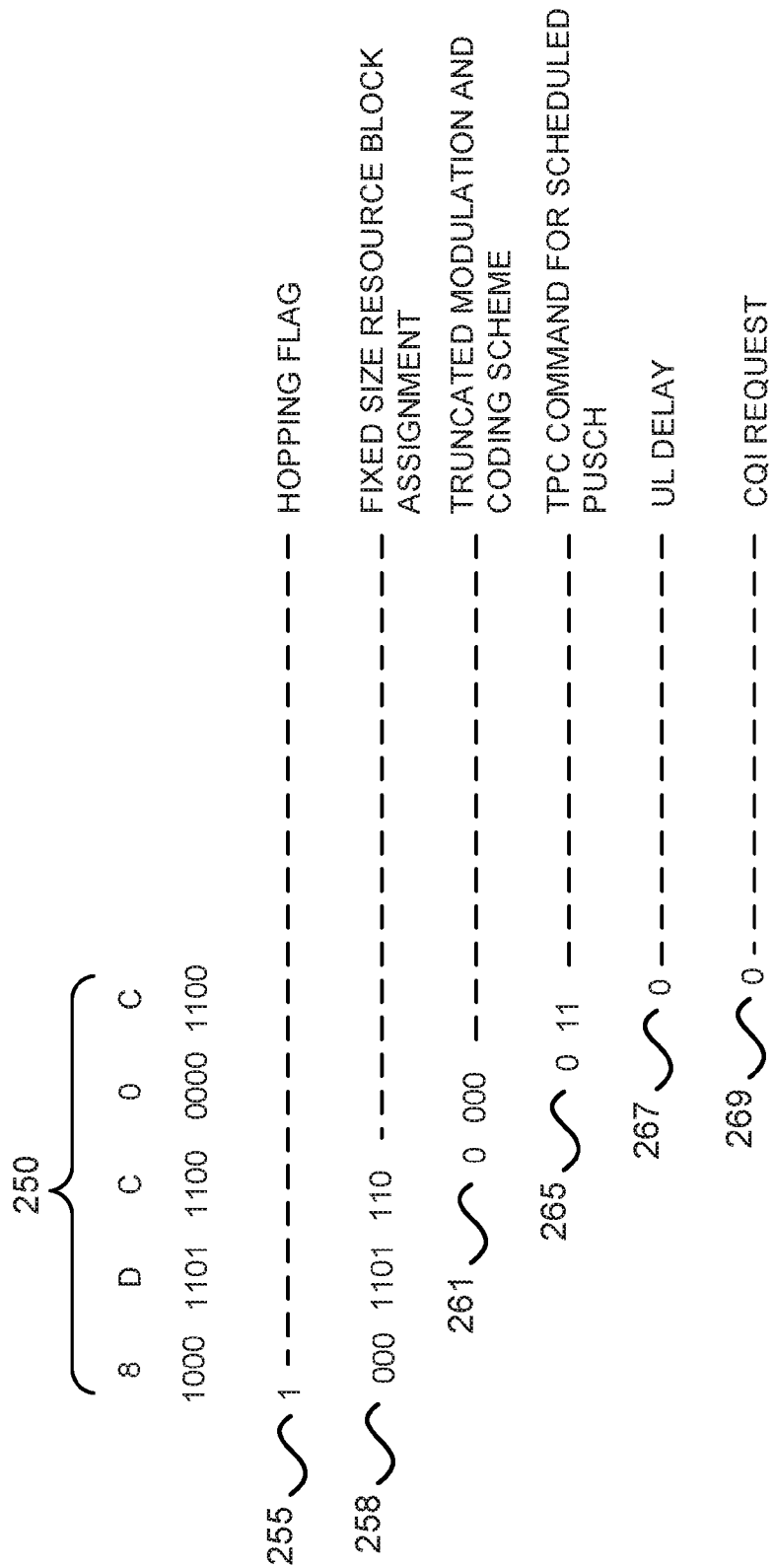

ACCESS NETWORK GROUP PAGING FOR END DEVICES

BACKGROUND

Given the limited resources of a wireless network, network providers and service providers continuously must address resource utilization and efficiency issues. These concerns stem from the ever-increasing number of wireless end devices that are used, such as user devices and other types of end devices (e.g., Internet of Things (IoT) devices, Machine Type Communication (MTC) devices, etc.).

BRIEF DESCRIPTION OF THE DRAWINGS

FIG. 2D is a diagram of an exemplary random access response (RAR) message;

DETAILED DESCRIPTION OF PREFERRED EMBODIMENTS

Figure 1:
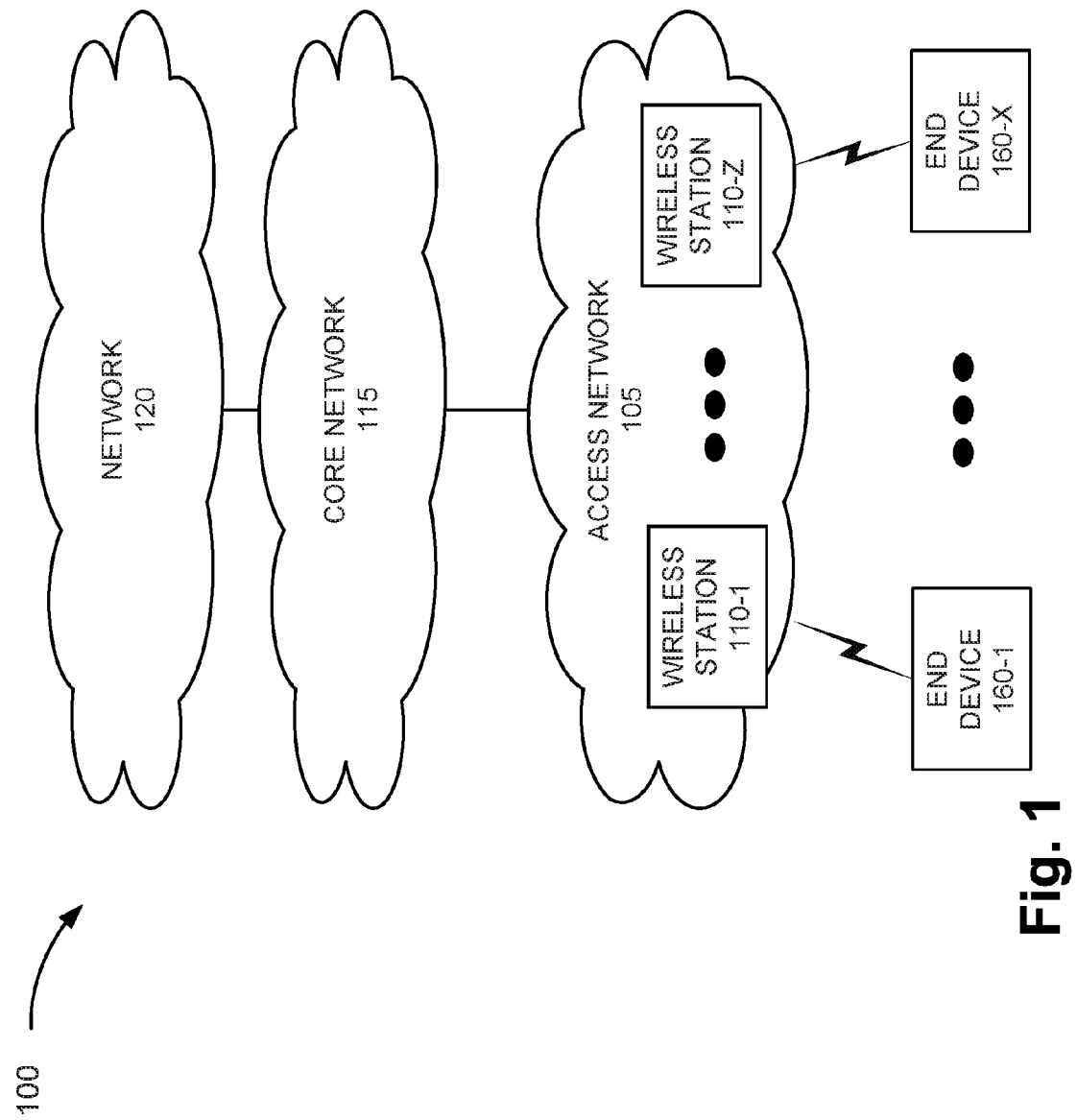
FIG. 1 is a diagram illustrating an exemplary environment in which an exemplary embodiment of a signaling service may be implemented.

The following detailed description refers to the accompanying drawings. The same reference numbers in different drawings may identify the same or similar elements. Also, the following detailed description does not limit the invention.

Efficient use of resources in a wireless network is essential to support the continuing increase in demand by end devices. For example, in a wireless network, such as a Long Term Evolution (LTE) network or LTE-Advanced (LTE-A) network, efficient use of resources that support paging signaling and other types of signaling are necessary. For example, given the ever-increasing number of end devices that are connected to the wireless network, radio resources are valuable and should be preserved. Additionally, identifiers are also becoming a more valuable facet of resources by virtue of the sheer number of end devices. For example, various types of user identifiers, such as an International Mobile Subscriber Identity (IMSI) and a Temporary Mobile Subscriber Identity (TMSI), and end device identifiers are resources that should be considered and preserved when possible.

According to an exemplary embodiment, a signaling service of a wireless network is described. According to an exemplary embodiment, the signaling service supports individual, subgroup, and group signaling of end devices. According to an exemplary implementation, the signaling service supports individual, subgroup, and group paging signaling.

According to an exemplary embodiment, the signaling service uses a multi-stage signaling procedure. According to an exemplary embodiment, during a first stage of the signaling service, a wireless station of the wireless network broadcasts a paging message, which includes a group identifier, to end devices. The group identifier identifies a group of end devices to which the paging pertains. The wireless station begins a timer subsequent to the transmission of the paging message. The timer allows the wireless station to identify a time that indicates when a subsequent message is scheduled to be transmitted.

According to an exemplary embodiment, each end device that receives the paging message may determine whether a group identifier stored at the end device matches the group identifier received in the paging message. When the group identifier matches based on a comparison, the end device starts a timer and waits to receive a subsequent message pertaining to the paging procedure. For example, the timer allows the end device to identify a time when the subsequent message is scheduled to be received. However, when the group identifier does not match based on the comparison, the end device may return to an idle mode, a sleep mode, or some other mode or state.

According to an exemplary embodiment, during a second stage of the signaling service, the wireless station of the wireless network generates a second message. According to an exemplary implementation, the second message includes a payload that indicates one or multiple instances of paging content. For example, the payload may indicate an individual end device identifier and/or a sub-group identifier of end devices of the group end devices to which the paging pertains. The payload may also include data that indicates a purpose of the paging (e.g., software update, an emergency alert, etc.) and/or any other data pertaining to the paging (e.g., urgency, etc.).

According to an exemplary embodiment, the wireless station encodes the second message based on a radio access-radio network temporary identifier (RA-RNTI) value. According to an exemplary implementation, the RA-RNTI value is set to 0000. According to other exemplary implementations, the RA-RNTI value may be set to a value other than 0000, as described herein. According to an exemplary embodiment, during the second stage of the signaling service, the wireless station of the wireless network broadcasts, based on its timer, the second message to end devices. For example, the wireless station may transmit the paging message at a time or a sub-frame (e.g., at N0). Thereafter, the wireless station may transmit the second message at a time or a sub-frame calculated by the timer (e.g., at N0+1+D), in which D may have a time or a sub-frame value (e.g., 0, 1, 2, etc.) that is configurable.

According to an exemplary embodiment, the end device receives the second message at the appropriate time, based on its timer. The end device uses a corresponding RA-RNTI value to decode the second message. When a cyclic redundancy check (CRC) is successful (e.g., passes), the end device determines whether an identifier (e.g., a sub-group identifier, an individual identifier, etc.) matches a corresponding identifier stored at the end device. When the identifier matches, the end device initiates a random access procedure to establish a radio resource control (RRC) connection with the wireless station and wireless network. When the identifier does not match, the end device may return to an idle mode, a sleep mode, or some other mode or state.

According to other exemplary embodiments, the signaling service includes more than one message subsequent to the transmission of the paging message. By way of example, the signaling service may include a paging message (e.g., that includes a group identifier), a second message (e.g., that includes a sub-group identifier or a sub-group identifier and a purpose of the paging), and a third message (e.g., that includes an individual identifier). That is, the number of messages and the content of messages are configurable. However, since the messages are broadcasted, efficient use of resources from the network-side and the end device-side in order to implement the signaling service is a consideration.

In view of the foregoing, the signaling service provides for group paging in a wireless network, as well as sub-group and individual paging. In this way, a consolidated signaling framework may reduce and more efficiently use resources relative to, for example, individual end device unicast signaling to a group of end devices. Additionally, network operators or other providers may more efficiently utilize identifier resources (e.g., IMSI resources, etc.) based on the group identifier and/or sub-group identifier while supporting the growing number of wireless end devices. The signaling service can also be integrated into various wireless network environments without negatively impacting existing paging techniques. For example, the timing offsets of the second message coupled with the value of the RA-RNTI may minimize any potential conflicts relative to other traffic and end devices to which the paging procedure is not directed.

FIG. 1 is a diagram illustrating an exemplary environment 100 in which an exemplary embodiment of a signaling service may be implemented. As illustrated, environment 100 includes an access network 105. Access network 105 includes wireless stations 110-1 through 110-Z (also referred to collectively as wireless stations 110 and, individually or generally as wireless station 110). Environment 100 further includes a core network 115 and a network 120. Environment 100 also includes end devices 160-1 through 160-X (also referred to collectively as end devices 160 and, individually or generally as end device 160). According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Access network 105 includes one or multiple networks of one or multiple types. For example, access network 105 may be implemented to include a terrestrial network and/or a satellite network. According to an exemplary implementation, access network 105 includes a radio access network (RAN). For example, the RAN may be a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of an LTE network or LTE-A network, a U-TRAN, a Universal Mobile Telecommunications System (UMTS) RAN, a Global System for Mobile Communications (GSM) RAN, a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.). Access network 105 may also include other types of networks, such as a WiFi network, a WiMAX network, a local area network (LAN), a personal area network (PAN), or other type of network that provides access to or can be used as an on-ramp to core network 115 and/or network 120.

Wireless station 110 includes a network device that has computational and wireless communicative capabilities. Wireless station 110 may be implemented as a base station (BS), a base transceiver station (BTS), a Node B, an evolved Node B (eNB), a remote radio head (RRH), an RRH and a baseband unit (BBU), a BBU, or other type of wireless node that provides wireless access to access network 105. According to an exemplary embodiment, wireless station 110 includes logic that provides the signaling service.

Core network 115 includes one or multiple networks of one or multiple types. For example, core network 115 may be implemented to include a terrestrial network and/or a satellite network. According to an exemplary implementation, core network 115 includes a complimentary network pertaining to the one or multiple RANs described. For example, core network 115 may include the core part of an LTE network, an LTE-A network, a CDMA network, a GSM network, and so forth. Depending on the implementation, core network 115 may include various network elements, such as a gateway, a support node, a serving node, a mobility management entity (MME), a router, a switch, a bridge, as well other network elements pertaining to various network-related functions, such as billing, security, authentication and authorization, network polices, subscriber profiles, and/or other network elements that facilitate the operation of core network 115.

Network 120 includes one or multiple networks of one or multiple types. For example, network 120 may include the Internet, the World Wide Web, a wide area network (WAN), a metropolitan area network (MAN), a service provider network, a private Internet Protocol (IP) network, an IP Multimedia Subsystem (IMS) network, or some other type of network that is external to core network 115 and/or access network 105. Network 120 may include network devices (not illustrated) that provide applications, services, and/or assets.

End device 160 includes a device that has computational and wireless communicative capabilities. End device 160 may be implemented as a mobile device, a portable device, or a stationary device. End device 160 may be implemented as an MTC device, an IoT device, a machine-to-machine (M2M) device, or some other type of similar wireless device. End device 160 may or may not be operated by a user. According to an exemplary embodiment, end device 160 includes logic that provides the signaling service.

Figure 2A:
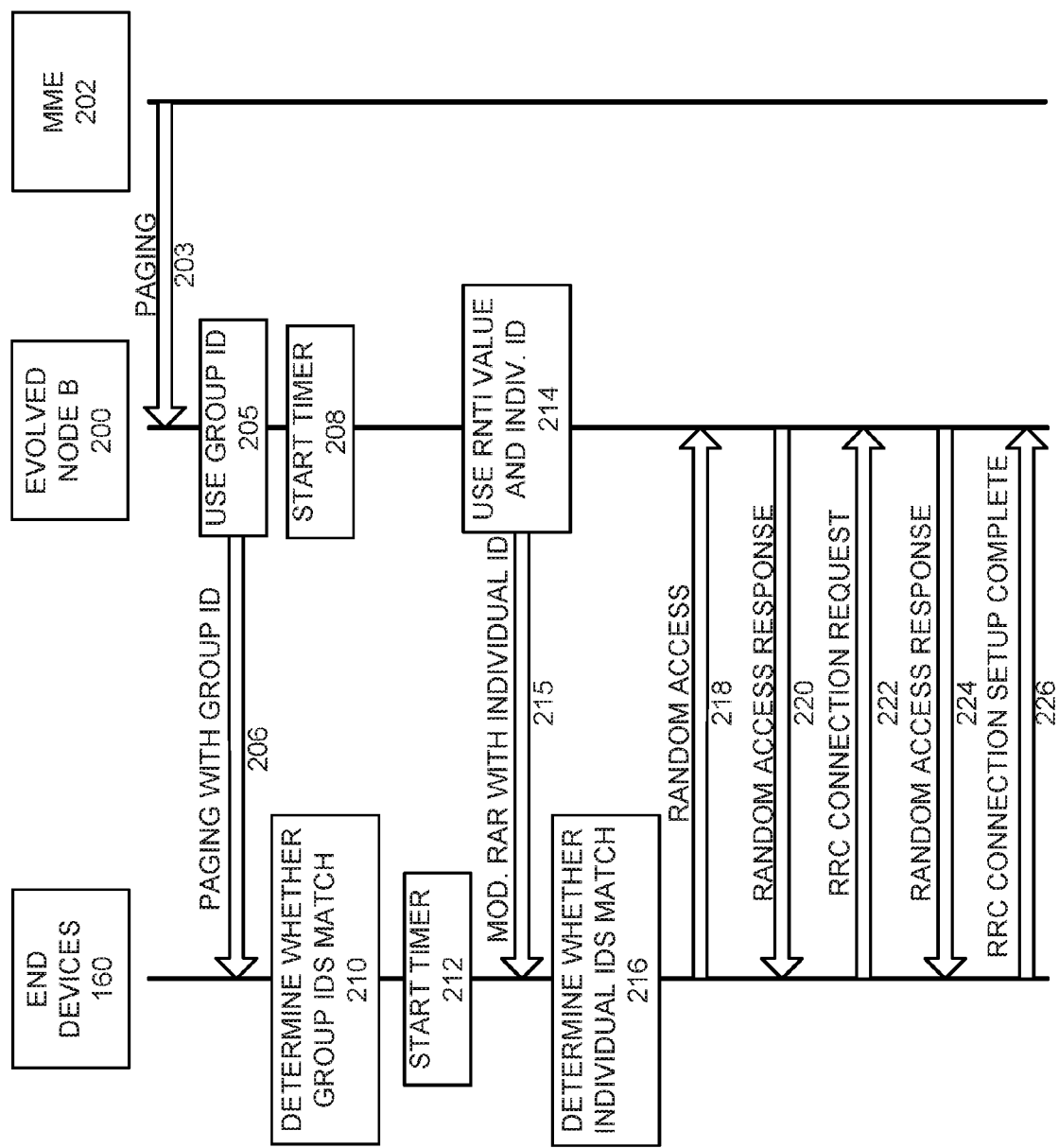
FIG. 2A is a diagram illustrating an exemplary process of the signaling service according to a group paging scenario.
Figure 2B:
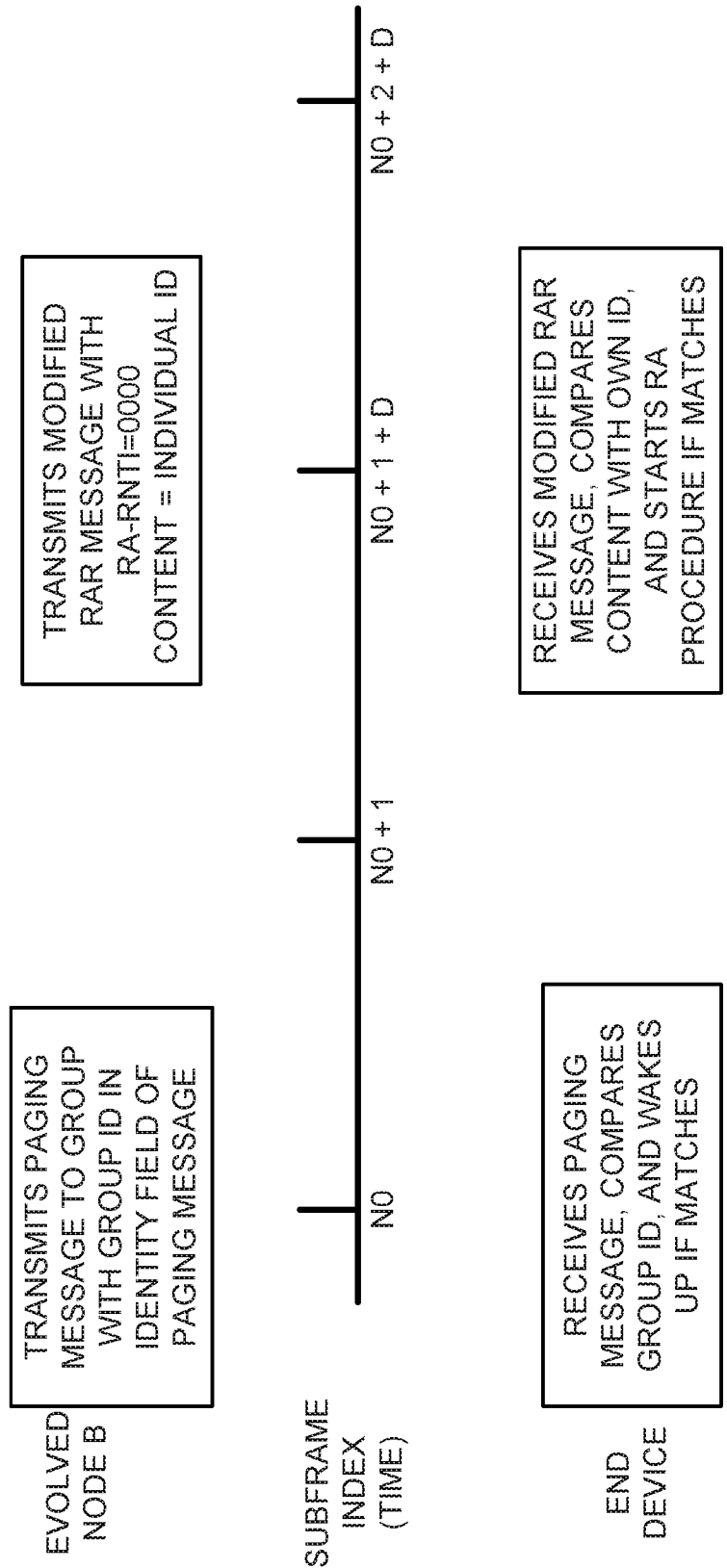
FIG. 2B is a diagram illustrating an exemplary timeline relative to operations of the process illustrated in FIG. 2A.

FIG. 2A is a diagram illustrating an exemplary process pertaining to an exemplary embodiment of the signaling service described herein. In FIG. 2A, assume that wireless station 110 is implemented as an evolved Node B (eNB) 200 in an E-UTRAN of an LTE or LTE-A network. Also assume that core network 115 includes an MME 202. FIG. 2B is a diagram illustrating an exemplary timeline relative to operations (e.g., messaging, etc.) illustrated and described in FIG. 2A and relating to the signaling service. Typically, in LTE, a paging frame corresponds to a radio frame that includes twenty sub-frames. The radio frame and the sub-frame may each correspond to a unit of time.

Referring to FIG. 2A, in step 203, MME 202 generates and transmits a paging message. For example, according to an exemplary implementation, the paging message includes a group identifier and an individual identifier. The paging message may also include a sub-group identifier. According to an exemplary implementation, the paging message includes an RA-RNTI value. According to other exemplary implementations, the RA-RNTI value may be selected by eNB 200. For example, eNB 200 may store a table or other data structure that correlates group and/or sub-group identifiers to RA-RNTI values. The paging message may also include other information elements/values pertaining to other aspects of paging (e.g., a paging discontinuous reception (DRX), list of tracking area identities (TAI), etc.). In step 205, eNB 200 receives and interprets the paging message. In response, eNB 200 generates a paging message to end devices 160. The paging message includes a group identifier that identifies a group of end devices 160. According to an exemplary implementation, the group identifier is carried in an information element (e.g., a UE identity field, an IMSI field, an SAE-Temporary Mobile Subscriber Identity (S-TMSI) field) of the paging message. According to an exemplary implementation, only one group is paged with respect to the paging message. According to other exemplary implementations, multiple groups may be paged using different group identifiers corresponding to the multiple groups. In step 206, eNB 200 transmits (e.g., broadcasts) the paging message. Referring to FIG. 2B, the paging message is transmitted during a sub-frame instance of N0.

Referring back to FIG. 2A, in step 208, eNB 200 starts a timer at or subsequent to the transmission of the paging message. In step 210, each end device 160, which is within the coverage area serviced by eNB 200 and configured to wake-up and check for paging messages (e.g., based on a DRX cycle), receives the paging message and compares the group identifier included in the paging message to a group identifier stored at end device 160. When the group identifiers do not match, end device 160 may return to an idle mode, a sleep mode, or some other mode or state. However, when the group identifiers match, in step 212, each end device 160 starts a timer for use in determining when to listen to a next message of the paging procedure. Referring to FIG. 2B, the paging message is received during the sub-frame instance of N0.

Referring to FIG. 2A, in step 214, and FIG. 2B, after a fixed or configurable sub-frame or time interval "D" (e.g., 0, 1, 2, etc.), eNB 200 generates and transmits a modified Random Access Response (RAR) message (e.g., at N0+1+D). In the E-UTRAN context, the RAR message is a physical layer message that includes various instances of data. For example, referring to FIG. 2D, and in accordance with the Third Generation Partnership Project (3GPP) Technical Specification (TS) 136 213 version 12.9.1 (2016-05), an RAR message 250 includes 20 bits of data, such as a hopping flag 255, block assignment bits 258, modulation and coding scheme bits 261, scheduled Physical Uplink Shared Channel (PUSCH) bits 265, an uplink delay bit 267, and a Channel Quality Indicator (CQI) bit 269. According to exemplary embodiments of the signaling service, the use of the modified RAR message to carry particular data pertaining to the paging procedure is configurable. For example, the modified RAR message may indicate an individual identifier that identifies an end device 160 that belongs to the group, a sub-group identifier that identifies a sub-group of end devices 160 that belongs to the group, a purpose of the paging (e.g., a software update, an emergency alert, etc.), and/or other information pertaining to the paging. In view of the different types of data that the modified RAR message may carry relative to RAR message 250, the message is named (for purposes of description) as a "modified RAR message." Similar to RAR message 250, the modified RAR message is a physical layer message. According to an exemplary implementation, the modified RAR message includes 20 bits of data. According to other exemplary implementations, the modified RAR message includes additional or fewer bits of data.

Referring back to FIGS. 2A and 2B, according to this example, the modified RAR message includes an individual identifier that identifies an end device 160 within the group. According to an exemplary embodiment, during generation of the modified RAR message, eNB 200 encodes the modified RAR message using an RA-RNTI value. For example, the RA-RNTI value is used as a key to encode the payload of the modified RAR message. According to an exemplary implementation, the RA-RNTI hexadecimal value is 0000. According to other exemplary implementations, the RA-RNTI value may be a value other than 0000, as described herein. In step 215, eNB 200 transmits (e.g., broadcasts) the modified RAR message to end devices 160.

In FIG. 2A, in step 216, and in FIG. 2B, when the timer of end device 160 indicates a particular timing window (e.g., at N0+1+D), end device 160 listens for the modified RAR message. Upon receipt of the modified RAR message, each end device 160 uses a corresponding RA-RNTI value to decode the modified RAR message. If the CRC is successful (e.g., passes), end device 160 inspects the payload of the modified RAR message to determine whether it contains an identifier that identifies end device 160. If the CRC is not successful (e.g., does not pass), end device 160 may return to an idle mode, a sleep mode, or some other state or mode. According to this example, assume that the CRC is successful. Additionally, according to this example, end device 160 compares the identifier (e.g., the individual identifier) included in the modified RAR message to an individual identifier that is stored at end device 160. When the individual identifiers match, end device 160 initiates a random access procedure. For example, end device 160 and eNB 200 may exchanges messages according to steps 218-226 illustrated in FIG. 2A. However, when the individual identifiers do not match, end device 160 may return to an idle mode, a sleep mode, or some other state or mode.

Although FIGS. 2A and 2B illustrate an exemplary process of the signaling service, according to other exemplary embodiments, additional, fewer, and/or different operations may be performed. For example, the process may include paging within a certain geographic area a number of times before expanding to a larger geographic area.

The exemplary process of the signaling service may have no negative impact on other end devices 160 to which the paging procedure is not directed. For example, for end devices 160 that are not part of the group (e.g., a first group), such end devices 160 are not configured to listen for the modified RAR message, much less listen at a time based on the time offset relative to the paging message. Thus, such end devices 160 will not mistakenly listen and/or receive the modified RAR message. Additionally, for end devices 160 that are not part of the group, but may be expecting a modified RAR message, the RA-RNTI value used to decode the modified RAR message will not match their RA-RNTI value. For example, such end devices 160 may use an RA-RNTI value between 0001 and 003C. Furthermore, for end devices 160 that are part of a different group (e.g., a second group), such end devices 160 will not be negatively impacted because these end devices 160 will be configured to listen for a modified RAR message at sub-frame or time instance other than the sub-frame or time instance (e.g., at N0+1+D) of the first group. Accordingly, such end devices 160 are not expecting the modified RAR message at the same time as another group based on having a different time offset.

Conversely, end devices 160 that are part of the group may not be negatively impacted by other traffic. For example, such end devices 160 are configured to monitor for the receipt of the modified RAR message and decode the modified RAR message using a particular RA-RNTI value (e.g., 0000). Additionally, no other modified RAR messages intended for other groups may be transmitted by wireless station 110 at this particular sub-frame time instance. Further, since other types of transmissions are based on other kinds of RNTIs, which may each have their own unique value, such end devices 160 may not mistakenly receive other kinds of traffic. For example, 3GPP TS 136 321 v13.1.0 (2016-03), which is incorporated by reference in its entirety, includes a Table 7.1 that indicates various RNTIs used in an E-UTRAN, such as a Cell-RNTI (C-RNTI), a Semi-Persistent Scheduling (SPS)C-RNTI, a Temporary C-RNTI, an enhanced Interference Mitigation and Traffic Adaptation (eIMTA)-RNTI, a Transmit Power Control-Physical Uplink Control Channel-RNTI (TPC-PUCCH-RTNI), a TPC-Physical Uplink Shared Channel-RNTI (TPC-PUSCH-RNTI), a Sidelink (SL)-RNTI, GERAN (G)-RNTI, a Single Cell-Notification-RNTI (SC-N-RNTI), a Single Cell-RNTI (SC-RNTI), a Common Control-RNTI (CC-RNTI), a MBMS-RNTI (M-RNTI), a Paging-RNTI (P-RNTI), and a System Information-RNTI (SI-RNTI). Each of these types of RNTIs may be assigned particular RNTI values. As indicated in Table 7.1, the RA-RNTI may have a hexadecimal value between 0001 and 003C. Table 7.1 also indicates that hexadecimal value 0000 is not assigned to any RNTI type, and that hexadecimal values FFF4 to FFF9 are reserved for future use.

According to some exemplary implementations, the RA-RNTI value used in the signaling service includes use of any one of these previously unused values (e.g., 0000; FFF4 to FFF9). According to other exemplary implementations, the RA-RNTI value used in the signaling service includes use of other values, such as a value between 0001 through 003C. While using one of the values between 0001-003C may yield a collision, the potential for the collision is minimal. For example, the collision would occur only when another end device 160 seeks access at the same time (and frequency) and relative to the same eNB 200. Further, even if such collision did occur, end device 160 may invoke a contention resolution procedure, as is well-known in the arts. The value and assignment of an RA-RNTI to a group, a sub-group, or an individual end device may be configured. For example, various classes or groups of end devices 160 may be assigned a different RA-RNTI value.

Figure 2C:
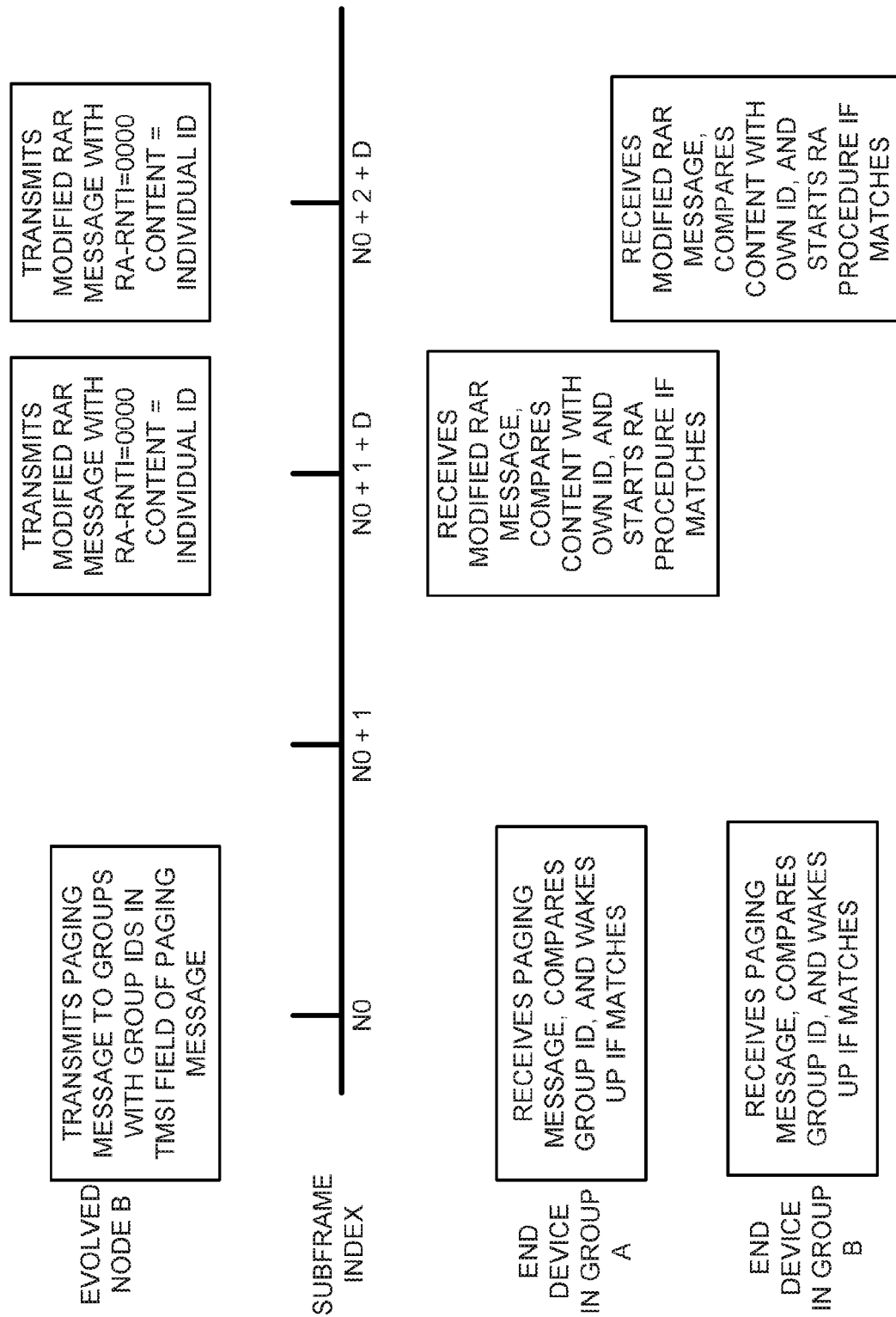
FIG. 2C is a diagram illustrating another exemplary timeline relative to operations of a process according to a multi-group scenario.

According to various exemplary embodiments, the signaling service provides paging for one or multiple groups. Unlike the example of FIG. 2B, FIG. 2C is a diagram illustrating another exemplary timeline relative to operations (e.g., messaging, etc.) illustrated and described in FIG. 2A and relating to the signaling service. As illustrated in FIG. 2C, the paging message may carry multiple group identifiers so as to page multiple groups of end devices 160. Additionally, eNB 200 may transmit the modified RAR message associated with each group at different times. In this way, the value of "D" may be different between the groups and afford a time offset so that collision is prevented or minimized.

While the modified RAR message may carry various data (e.g., a sub-group identifier, an individual identifier, a purpose of the paging, etc.), as previously described, according to various embodiments of the signaling service, a series of modified RAR messages may be transmitted by eNB 200 to end devices 160. By way of further example, referring to FIG. 3 and in a manner previously described in relation to FIG. 2A, in step 303, MME 202 generates and transmits a paging message. For example, according to an exemplary implementation, the paging message includes an information element pertaining to a group identifier and, a sub-group identifier and/or an individual identifier. According to an exemplary implementation, the paging message includes an RA-RNTI value. According to other exemplary implementations, the RA-RNTI value may be selected by eNB 200. The paging message may also include other information elements/values pertaining to other aspects of paging. In step 305, eNB 200 receives and interprets the paging message. In response, eNB 200 generates a paging message to end devices 160. The paging message includes a group identifier that identifies a group of end devices 160. In step 306, eNB 200 transmits (e.g., broadcasts) the paging message. In step 308, eNB 200 starts a timer 308 at or subsequent to the transmission of the paging message. In step 310, each end device 160, which is within the coverage area serviced by eNB 200 and configured to wake-up and check for paging messages (e.g., based on a DRX cycle), receives the paging message and compares the group identifier included in the paging message to a group identifier stored at end device 160. When the group identifiers do not match, end device 160 may return to an idle mode, a sleep mode, or some other mode or state. However, when the group identifiers match, in step 312, each end device 160 starts a timer for use in determining when to listen to a next message of the paging procedure.

In step 314, after a fixed or configurable sub-frame or time interval "D" (e.g., 0, 1, 2, etc.), eNB 200 generates and transmits a modified RAR message (e.g., at N0+1+D). According to this example, the modified RAR message includes a sub-group identifier that identifies a sub-group of end device 160 within the group. According to an exemplary embodiment, during generation of the modified RAR message, eNB 200 encodes the modified RAR message using an RA-RNTI value. In step 315, eNB 200 transmits (e.g., broadcasts) the modified RAR message to end devices 160. In step 316, when the timer of end device 160 expires at the particular timing window (e.g., at N0+1+D), end device 160 listens for the modified RAR message. Upon receipt of the modified RAR message, each end device 160 uses a corresponding RA-RNTI value to decode the modified RAR message. If the CRC is successful, end device 160 inspects the payload of the modified RAR message to determine whether it contains an identifier that identifies end device 160. If the CRC is not successful, end device 160 may return to an idle mode, a sleep mode, or some other state or mode. According to this example, assume that the CRC is successful. Additionally, according to this example, end device 160 compares the identifier (e.g., the sub-group identifier) included in the modified RAR message to a sub-group identifier that is stored at end device 160. When the subgroup identifiers match for end device 160, such end device 160 may listen for a subsequent modified RAR message. When the sub-group identifiers do not match for end device 160, such end device 160 may return to an idle mode, etc.

In step 318, after an expiration of another time interval calculated by the timer, eNB 200 generates and transmits another modified RAR message (e.g., at N0+2+D). According to this example, the modified RAR message includes an individual identifier that identifies an individual end device 160. According to an exemplary embodiment, eNB 200 encodes the modified RAR message using an RA-RNTI value. According to an exemplary implementation, the RA-RNTI value may be the same RA-RNTI value used in step 314. According to another exemplary implementation, the RA-RNTI value may be different from the RA-RNTI value used in step 314. In step 319, eNB 200 transmits (e.g., broadcasts) the modified RAR message to end devices 160.

Figure 3:
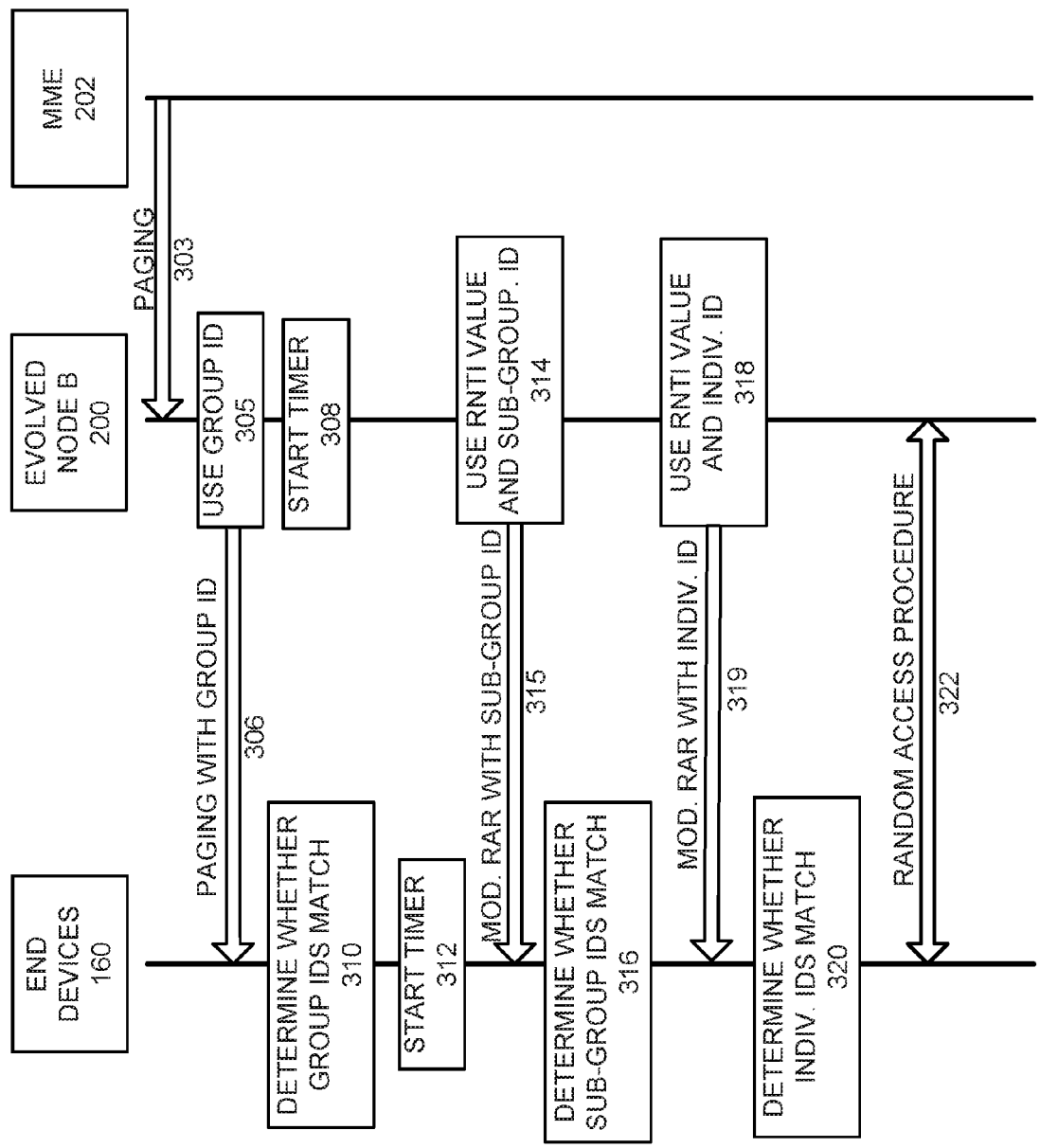
FIG. 3 is a diagram illustrating another exemplary process of the signaling service according to a group and sub-group paging scenario.

In step 320, when the timer of end device 160 expires at a particular timing window (e.g., at N0+2+D), end device 160 listens for the modified RAR message. Upon receipt of the modified RAR message, each end device 160 uses a corresponding RA-RNTI value to decode the modified RAR message. If the CRC is successful, end device 160 inspects the payload of the modified RAR message to determine whether it contains an identifier that identifies end device 160. If the CRC is not successful, end device 160 may return to an idle mode, a sleep mode, or some other state or mode. According to this example, assume that the CRC is successful. Additionally, according to this example, end device 160 compares the identifier (e.g., the individual identifier) included in the modified RAR message to an individual identifier that is stored at end device 160. When the individual identifiers match for end device 160, in step 322, such end device 160 initiates a random access procedure in a manner previously described. When the individual identifiers do not match for end device 160, such end device 160 may return to an idle mode, etc. Although FIG. 3 illustrates an exemplary process of the signaling service, according to other exemplary embodiments, additional, fewer, and/or different operations may be performed.

Figure 4:
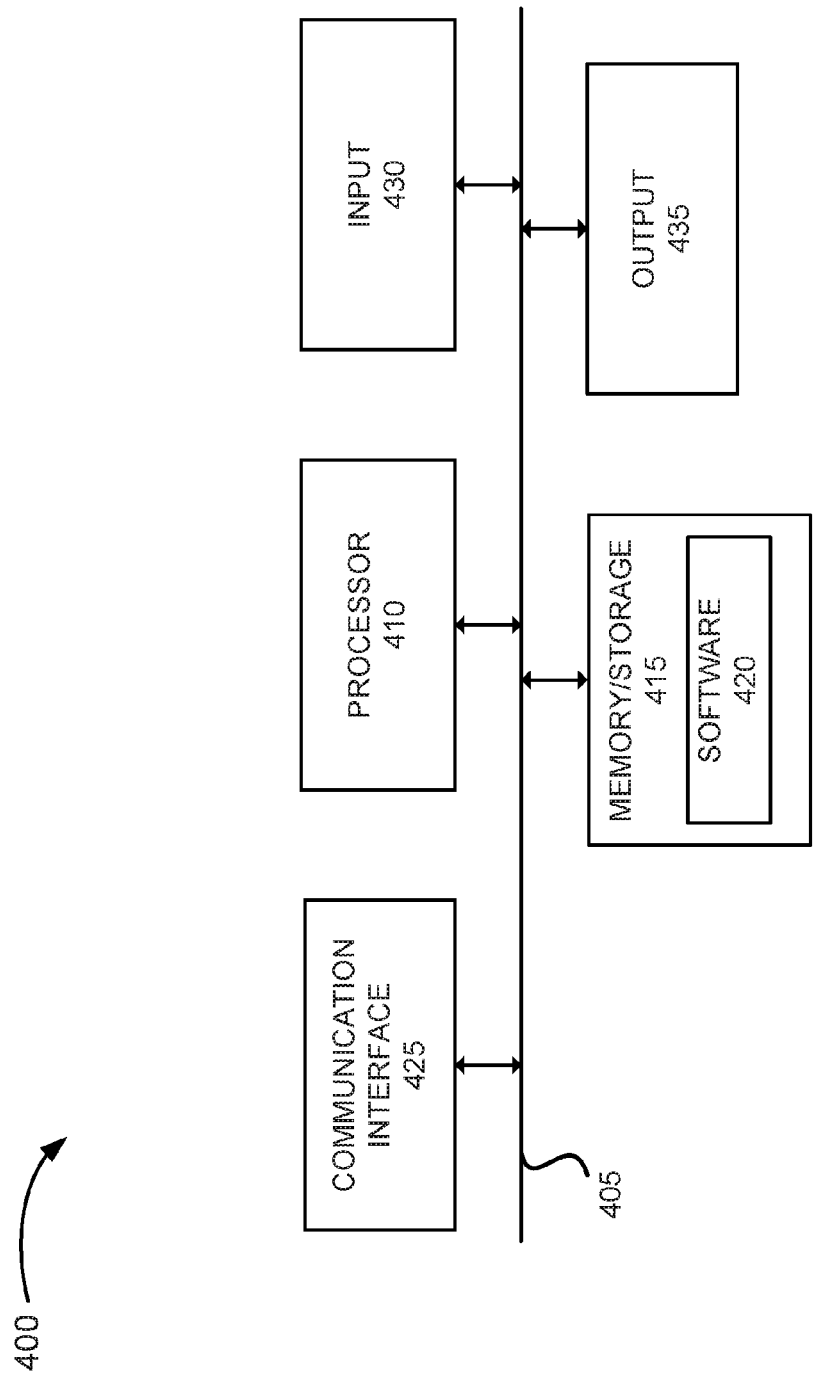
FIG. 4 is a diagram illustrating exemplary components of a device that may correspond to one or more of the devices illustrated herein.

FIG. 4 is a diagram illustrating exemplary components of a device 400 that may correspond to one or more of the devices in environment 100. For example, device 400 may correspond to components of wireless station 110, end device 160, eNB 200, and MME 202. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.).

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.) and a corresponding drive. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 415 may store data, software, and/or instructions related to the operation of device 400.

Software 420 includes an application or a program that provides a function and/or a process. As an example, with reference to end device 160, software 620 may include an application that, when executed by processor 610, provides the functions of the signaling service, as described herein. Similarly, wireless station 110 and eNB 200 may include an application that, when executed by processor 410, provides the functions of the signaling service, as described herein. Software 420 is also intended to include firmware, middleware, microcode, hardware description language (HDL), and/or other form of instruction.

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
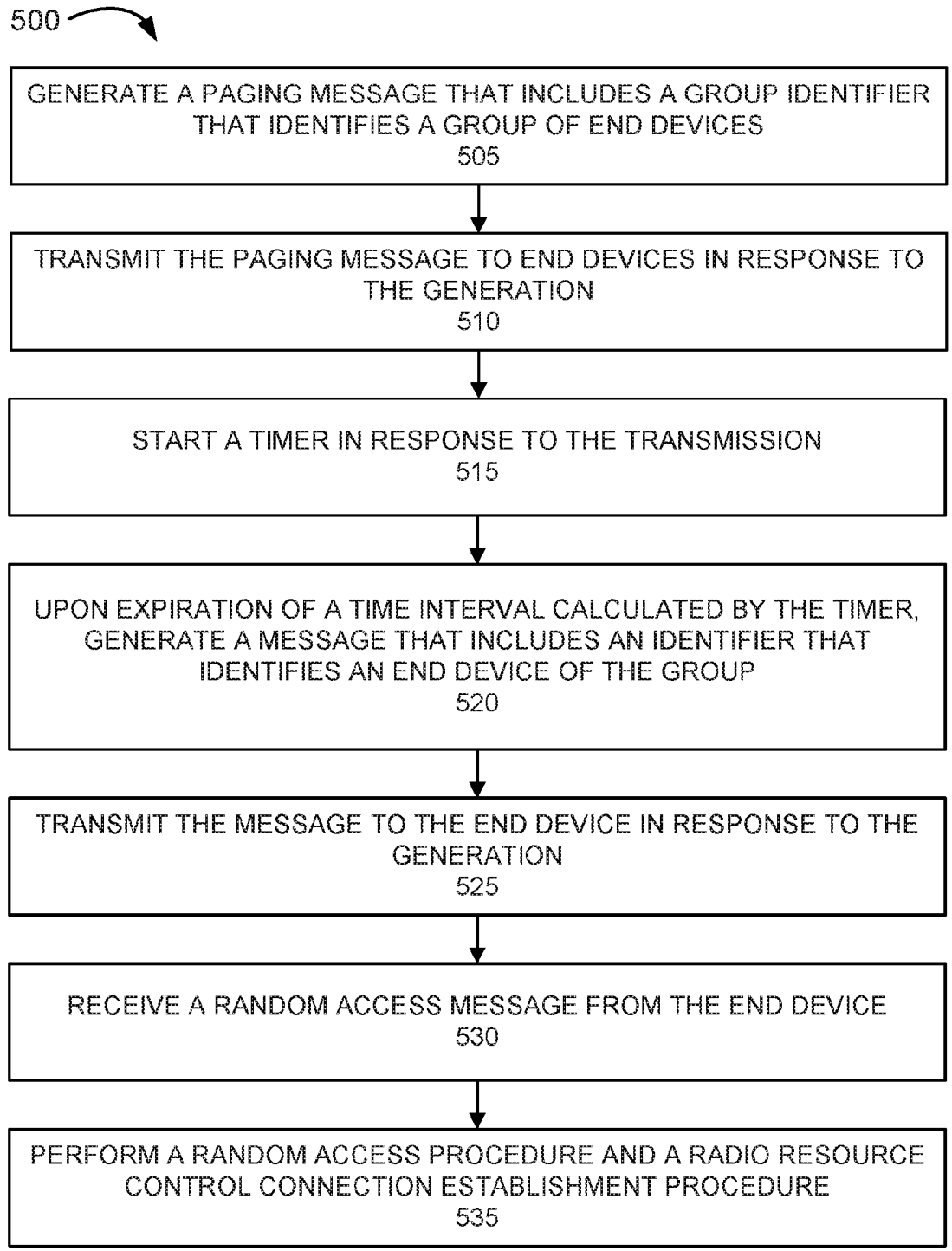
FIG. 5 is a flow diagram of an exemplary process of the signaling service performed by the wireless station.

FIG. 5 is a flow diagram illustrating an exemplary process 500 pertaining to the signaling service. Process 500 is directed to a process previously described above with respect to FIGS. 2A and 2B, as well as elsewhere in this description, in which a multi-stage paging procedure is performed. According to an exemplary embodiment, wireless station 110 performs steps of process 500. For example, processor 410 executes software 420 to perform the steps illustrated in FIG. 5 and described herein.

Referring to FIG. 5, block 505 of process 500, a paging message that includes a group identifier is generated. For example, wireless station 110 generates a paging message in response to a paging event. For example, the paging event may correspond to receipt of a message (e.g., a page from MME 202). The paging event may provide wireless station 110 with multiple identifiers of end devices 160.

In block 510, the paging message is transmitted. For example, wireless station 110 transmits (e.g., broadcasts) the paging message in response to the generation of the paging message. In block 515, a timer is started. For example, wireless station 110 starts a timer in response to the transmission of the paging message. Wireless station 110 uses the timer to calculate when another message of the paging procedure is to be transmitted.

In block 520, a message that includes an identifier that identifies an end device is generated upon expiration of a time interval calculated by the timer. For example, wireless station 110 generates a modified RAR message. The modified RAR message includes one or multiple identifiers that identify end device 160. For example, the identifier may be a sub-group identifier that identifies a sub-group of end devices 160 that belong to the group of end devices 160 identified by the group identifier. Additionally, or alternatively, the identifier may be an individual identifier that identifies a single end device 160. Additionally, for the example, the modified RAR message may include data that indicates a purpose of the message as it relates to paging. Wireless station 110 also generates the message based on an RA-RNTI value, as previously described.

In block 525, the message is transmitted. For example, wireless station 110 transmits (e.g., broadcasts) the modified RAR message in response to the generation of the message. In block 530, a random access message is received from an end device. For example, wireless station 110 receives a random access message, which is a part of a random access procedure, from end device 160. The random access message includes a random access preamble. In block 535, a random access procedure and a radio resource control (RRC) connection establishment procedure is performed. For example, wireless station 110 receives and interprets the random access message and generates a random access response message to end device 160. Subsequently, wireless station 110 performs an RRC connection procedure.

Although FIG. 5 illustrates an exemplary process 500 of the signaling service, according to other embodiments, process 500 may include additional operations, fewer operations, and/or different operations than those illustrated in FIG. 5 and described herein.

Figure 6A:
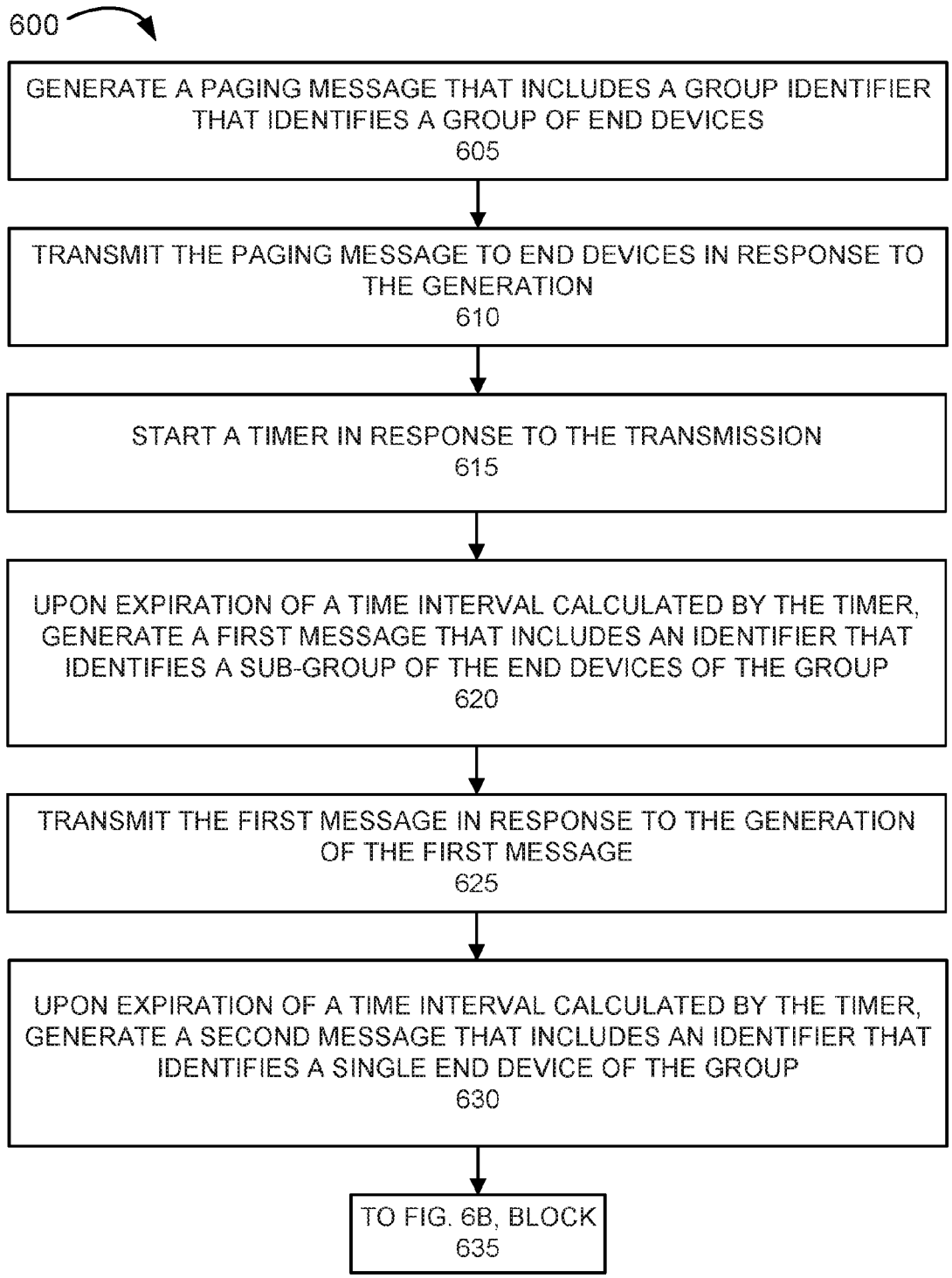
FIGS. 6A and 6B are flow diagrams of another exemplary process of the signaling service performed by the wireless station.
Figure 6B:
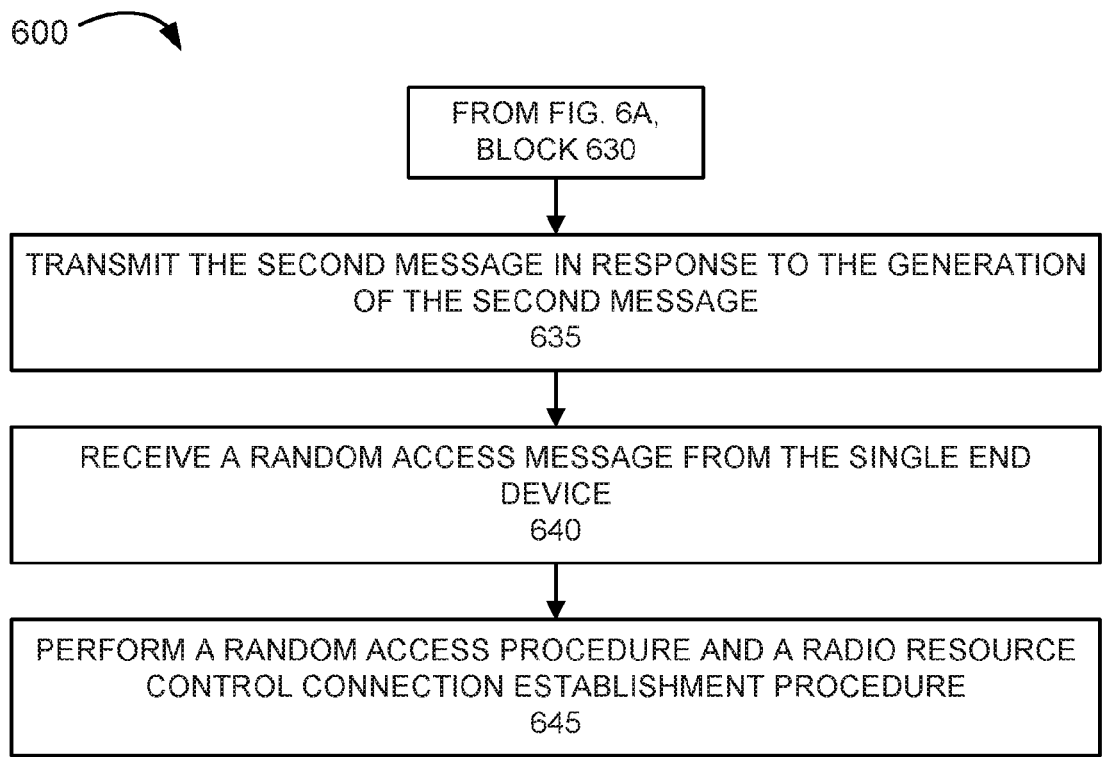

FIGS. 6A and 6B are flow diagrams illustrating an exemplary process 600 pertaining to the signaling service. Process 600 is directed to a process previously described above with respect to FIG. 3, as well as elsewhere in this description, in which a multi-stage paging procedure is performed that includes a series of messages transmitted subsequent to the paging message. According to an exemplary embodiment, wireless station 110 performs steps of process 600. For example, processor 410 executes software 420 to perform the steps illustrated in FIGS. 6A and 6B and described herein.

Referring to FIG. 6A, block 605 of process 600, a paging message that includes a group identifier is generated. For example, wireless station 110 generates a paging message in response to a paging event. For example, the paging event may be receipt of a message (e.g., a page from MME 202). The paging event may provide wireless station 110 with multiple identifiers of end device 160.

In block 610, the paging message is transmitted. For example, wireless station 110 transmits (e.g., broadcasts) the paging message in response to the generation of the paging message. In block 615, a timer is started. For example, wireless station 110 starts a timer in response to the transmission of the paging message. Wireless station 110 uses the timer to calculate when another message of the paging procedure is to be transmitted.

In block 620, a first message that includes an identifier that identifies a sub-group of end devices is generated upon expiration of a time interval calculated by the timer. For example, wireless station 110 generates a modified RAR message. The modified RAR message includes one or multiple identifiers that identify end device 160. For example, the identifier may be a sub-group identifier that identifies a sub-group of end devices 160 that belong to the group of end devices 160 identified by the group identifier. Additionally, for the example, the modified RAR message may include data that indicates a purpose of the message as it relates to paging. Wireless station 110 also generates the first message based on an RA-RNTI value, as previously described.

In block 625, the first message is transmitted. For example, wireless station 110 transmits (e.g., broadcasts) the modified RAR message in response to the generation of the message. In block 630, a second message that includes an identifier that identifies an individual end device is generated upon expiration of a time interval calculated by the timer. For example, wireless station 110 generates another modified RAR message. The modified RAR message includes one or multiple identifiers that identify end device 160. For example, the identifier may be an individual identifier that identifies a single end device 160. Wireless station 110 also generates the second message based on an RA-RNTI value, as previously described. The RA-RNTI value may be the same as or different from the RA-RNTI value used in block 620.

In block 635 (FIG. 6B), the second message is transmitted. For example, wireless station 110 transmits (e.g., broadcasts) the second modified RAR message in response to the generation of the second message. In block 640, a random access message is received from an end device. For example, wireless station 110 receives a random access message, which is a part of a random access procedure, from end device 160. The random access message includes a random access preamble. In block 645, a random access procedure is performed. For example, wireless station 110 receives and interprets the random access message and generates a random access response message to end device 160. Subsequently, wireless station 110 performs an RRC connection establishment procedure.

Although FIGS. 6A and 6B illustrate an exemplary process 600 of the signaling service, according to other embodiments, process 600 may include additional operations, fewer operations, and/or different operations than those illustrated in FIGS. 6A and 6B and described herein. For example, the content of the first message and the second message may be different than that described. For example, the second message may indicate the purpose of the page. Additionally, or alternatively, the second message may include a sub-group identifier.

Figure 7:
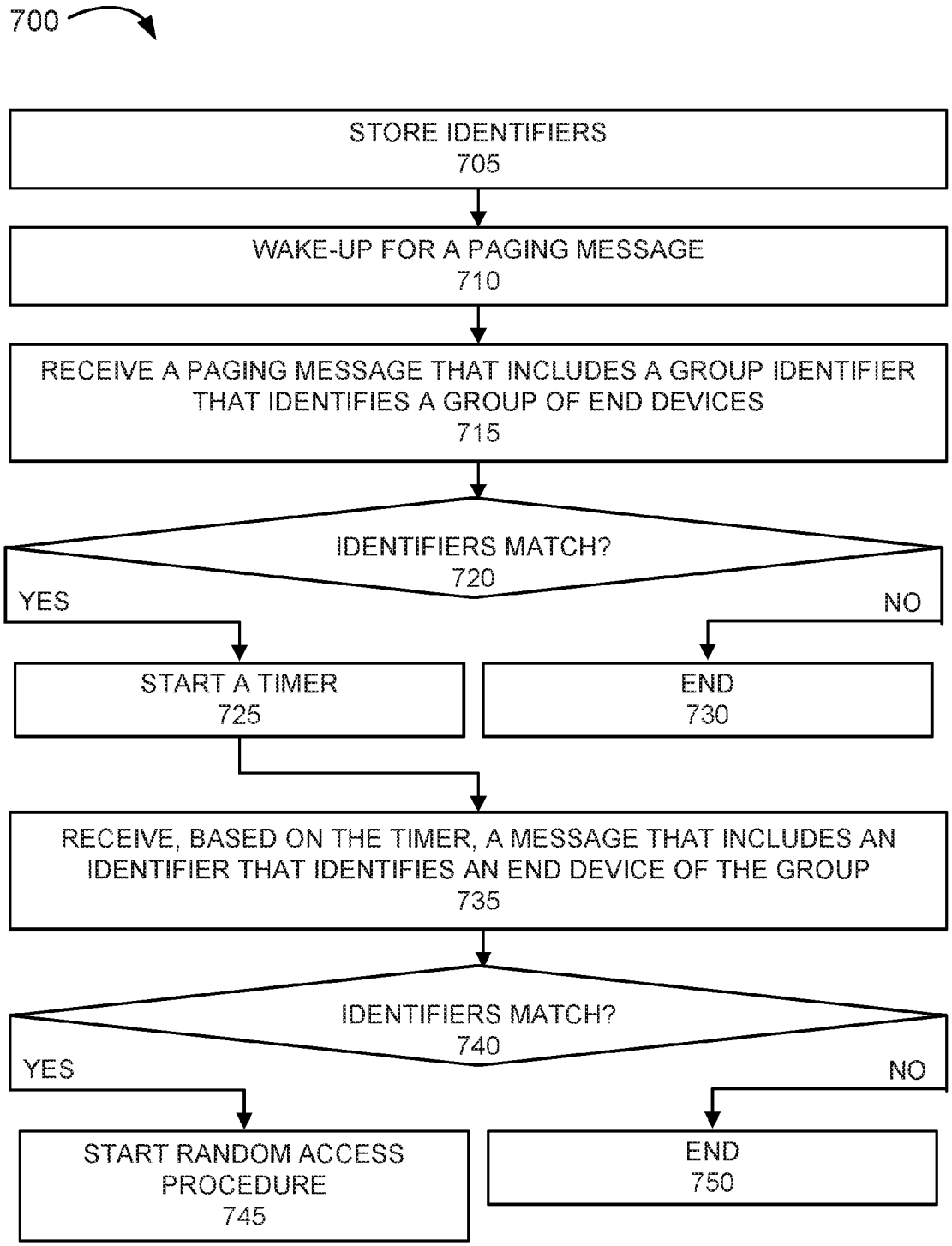
FIG. 7 is a flow diagram of an exemplary process of the signaling service performed by the end device.

FIG. 7 is a flow diagram illustrating an exemplary process 700 pertaining to the signaling service. Process 700 is directed to a process previously described above with respect to FIGS. 2A and 2B, as well as elsewhere in this description, in which a multi-stage paging procedure is performed. According to an exemplary embodiment, end device 160 performs steps of process 700. For example, processor 410 executes software 420 to perform the steps illustrated in FIG. 7 and described herein.

Referring to FIG. 7, block 705 of process 700, identifiers are stored. For example, end device 160 stores a global identifier that identifies a group to which end device 160 belongs. End device 160 also stores an individual identifier that uniquely identifies end device 160 within the group. End device 160 may also store a sub-group identifier that identifies a sub-group to which end device 160 belongs within the group.

In block 710, the end device wakes up for a paging message. For example, end device 160 wakes up from another state (e.g., an idle mode, etc.) so as to receive a paging message. By way of further example, the wake-up time may be governed by a DRX cycle as such DRX cycle pertains to paging.

In block 715, a paging message that includes a group identifier that identifies a group of end devices is received. For example, end device 160 receives and interprets the paging message during the wake-up period.

In block 720, it is determined whether the identifiers match. For example, end device 160 compares the group identifier included in the paging message to the group identifier stored at end device 160. When it is determined that the identifiers match (block 720—YES), a timer is started (block 725). For example, end device 160 starts a timer that is used to calculate when a subsequent message pertaining to the paging procedure is to be received. When it is determined that the identifiers do not match (block 720—NO), process 700 may end (block 730). For example, end device 160 may return to another state (e.g., an idle mode, etc.).

In block 735, a message that includes an identifier that identifies an end device is received. For example, end device 160 receives the message during a time interval calculated by the timer. By way of further example, the message corresponds to a modified RAR message. The modified RAR message may include a sub-group identifier that identifies a sub-group of end devices 160 that are of the group and/or an individual identifier that identifies an individual end device 160 that is of the group. End device 160 may select an RA-RNTI value, which corresponds to the RA-RNTI value used to encode the modified RAR message, so as to decode the modified RAR message. When the CRC is successful, end device 160 interprets the content of the modified RAR message.

In block 740, it is determined whether the identifiers match. For example, end device 160 compares the sub-group identifier and/or the individual identifier included in the message to the sub-group identifier and/or the individual identifier stored at end device 160.

When it is determined that the identifiers match (block 740—YES), a random access procedure may be started (block 745). For example, end device 160 may transmit a random access message, as a part of a random access procedure, to wireless station 110.

When it is determined that the identifiers do not match (block 740—NO), process 700 may end (block 750). For example, end device 160 may return to another state (e.g., an idle mode, etc.).

Although FIG. 7 illustrates an exemplary process 700 of the signaling service, according to other embodiments, process 700 may include additional operations, fewer operations, and/or different operations than those illustrated in FIG. 7 and described herein. For example, in block 735, the message may include a purpose of the paging.

Figure 8A:
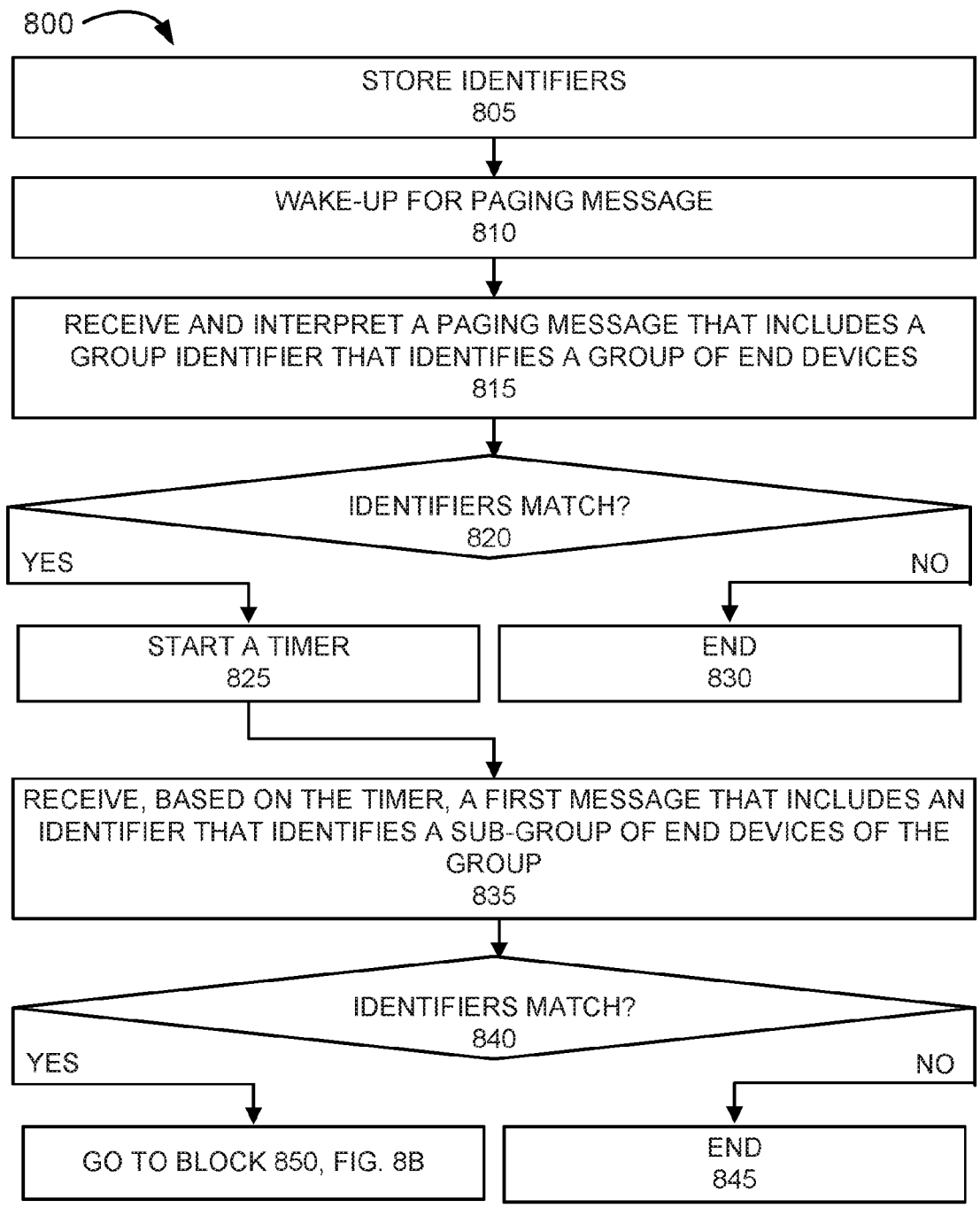
FIGS. 8A and 8B are flow diagrams of another exemplary process of the signaling service performed by the end device.
Figure 8B:
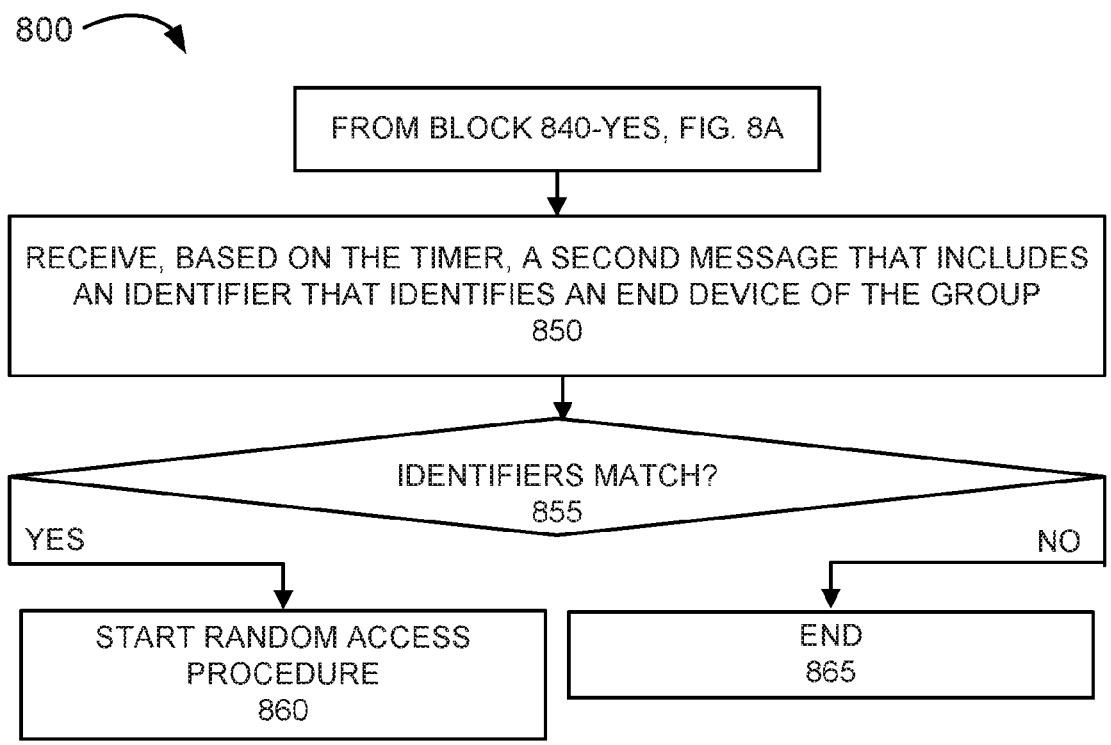

FIGS. 8A and 8B are flow diagrams illustrating an exemplary process 800 pertaining to the signaling service. Process 800 is directed to a process previously described above with respect to FIG. 3, as well as elsewhere in this description, in which a multi-stage paging procedure is performed that includes a series of messages transmitted subsequent to the paging message. According to an exemplary embodiment, end device 160 performs steps of process 800. For example, processor 410 executes software 420 to perform the steps illustrated in FIGS. 8A and 8B and described herein.

Referring to FIG. 8A, block 805 of process 800, identifiers are stored. For example, end device 160 stores a global identifier that identifies a group to which end device 160 belongs. End device 160 also stores an individual identifier that uniquely identifies end device 160 within the group. End device 160 may also store a sub-group identifier that identifies a sub-group to which end device 160 belongs within the group.

In block 810, the end device wakes up for a paging message. For example, end device 160 wakes up from another state (e.g., an idle mode, etc.) so as to receive a paging message. By way of further example, the wake-up time may be governed by a DRX cycle as such DRX cycle pertains to paging.

In block 815, a paging message that includes a group identifier that identifies a group of end devices is received. For example, end device 160 receives and interprets the paging message during the wake-up period.

In block 820, it is determined whether the identifiers match. For example, end device 160 compares the group identifier included in the paging message to the group identifier stored at end device 160. When it is determined that the identifiers match (block 820—YES), a timer is started (block 825). For example, end device 160 starts a timer that is used to calculate when a subsequent message pertaining to the paging procedure is to be received. When it is determined that the identifiers do not match (block 820—NO), process 800 may end (block 830). For example, end device 160 may return to another state (e.g., an idle mode, etc.).

In block 835, a first message that includes an identifier that identifies an end device is received. For example, end device 160 receives the first message during a first time interval calculated by the timer. By way of further example, the message corresponds to a modified RAR message. The modified RAR message may include a sub-group identifier that identifies a sub-group of end devices 160 that are of the group. End device 160 may select an RA-RNTI value, which corresponds to the RA-RNTI value used to encode the modified RAR message, so as to decode the modified RAR message. When the CRC is successful, end device 160 interprets the content of the modified RAR message.

In block 840, it is determined whether the identifiers match. For example, end device 160 compares the sub-group identifier included in the first message to the sub-group identifier stored at end device 160. When it is determined that the identifiers do not match (block 840—NO), process 800 may end (block 845). For example, end device 160 may return to another state (e.g., an idle mode, etc.).

When it is determined that the identifiers match (block 840—YES), process 800 continues to block 850 of FIG. 8B. For example, in block 850, a second message that includes an identifier that identifies an end device is received. For example, end device 160 receives the second message during a second time interval calculated by the timer. By way of further example, the message corresponds to a modified RAR message. The modified RAR message may include an individual identifier that identifies an individual end device 160 that is of the group and the sub-group. End device 160 may select an RA-RNTI value, which corresponds to the RA-RNTI value used to encode the modified RAR message, so as to decode the modified RAR message. When the CRC is successful, end device 160 interprets the content of the modified RAR message.

In block 855, it is determined whether the identifiers match. For example, end device 160 compares the individual identifier included in the second message to the individual identifier stored at end device 160.

When it is determined that the identifiers match (block 855—YES), a random access procedure may be started (block 860). For example, end device 160 may transmit a random access message, as a part of a random access procedure, to wireless station 110.

When it is determined that the identifiers do not match (block 855—NO), process 800 may end (block 865). For example, end device 160 may return to another state (e.g., an idle mode, etc.).

Although FIGS. 8A and 8B illustrate an exemplary process 800 of the signaling service, according to other embodiments, process 800 may include additional operations, fewer operations, and/or different operations than those illustrated in FIGS. 8A and 8B and described herein. For example, the content of the first message and the second message may be different than that described. For example, the second message may indicate the purpose of the page. Additionally, or alternatively, the second message may include a sub-group identifier.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5-8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

No element, act, or instruction described in the present application should be construed as critical or essential to the embodiments described herein unless explicitly described as such.

What is claimed is:

1. A method comprising:
   generating, by a wireless station, a paging message that includes a group identifier that identifies a group of end devices to which a paging pertains;
   broadcasting, by the wireless station, the paging message in response to the generating;

starting, by the wireless station, a first timer in response to the broadcasting of the paging message;
generating, by the wireless station and in response to a first time interval calculated by the first timer, a first message that includes at least one of a sub-group identifier, which identifies a sub-group of the end devices of the group to which the paging pertains, or an individual identifier, which identifies one of the end devices of the group to which the paging pertains, wherein the first message is generated based on a radio access-radio network temporary identifier (RA-RNTI) value; and
broadcasting, by the wireless station, the first message in response to the generating of the first message.

2. The method of claim 1, wherein the RA-RNTI value is equal to one of a hexadecimal value of 0000 or a hexadecimal value between FFF4 and FFF9.

3. The method of claim 1, wherein the first message includes data that indicates a purpose of the paging.

4. The method of claim 1, further comprising:
receiving, by the wireless station and from one or more of the end devices, one or more random access messages in response to the broadcasting of the first message; and
transmitting, by the wireless station and to the one or more of the end devices, one or more random access response messages in response to the receiving of the one or more random access messages.

5. The method of claim 1, further comprising:
storing, by the one of the end devices, the group identifier and the individual identifier;
receiving, by the one of the end devices, the paging message;
comparing, by the one of the end devices, the group identifier of the paging message with the stored group identifier;
determining, by the one of the end devices, whether the group identifier of the paging message matches the stored group identifier; and
starting, by the one of the end devices, a second timer in response to determining that the group identifier of the paging message matches the stored group identifier.

6. The method of claim 5, further comprising:
receiving, by the one of the end devices and in response to a second time interval calculated by the second timer, the first message;
comparing, by the one of the end devices, the individual identifier of the first message with the stored individual identifier;
determining, by the one of the end devices, whether the individual identifier of the first message matches the stored individual identifier; and
initiating, by the one of the end devices, a random access procedure in response to determining that the individual identifier of the first message matches the stored individual identifier; and
operating, by the one of the end devices, in an idle mode in response to determining that the individual identifier of the first message does not match the stored individual identifier.

7. The method of claim 1, further comprising:
generating, by the wireless station and in response to a second time interval calculated by the timer, a second message that includes at least one of a sub-group identifier, which identifies a sub-group of the end devices of the group to which the paging pertains, or an individual identifier, which identifies one of the end devices of the group to which the paging pertains, wherein the second message is generated based on a RA-RNTI value and the second time interval is subsequent to the first time interval; and
broadcasting, by the wireless station, the second message in response to the generating of the second message, wherein the RA-RNTI value of the first message is different from the RA-RNTI value of the second message.

8. The method of claim 1, wherein the RA-RNTI value is equal to a value between 0001 and 003C.

9. A device comprising:
a communication interface;
a memory, wherein the memory stores instructions; and
a processor, wherein the processor executes the instructions to:
generate a paging message that includes a group identifier that identifies a group of end devices to which a paging pertains;
broadcast, via the communication interface, the paging message in response to the generation;
start a timer in response to the broadcast of the paging message;
generate, in response to a first time interval calculated by the timer, a first message that includes at least one of a sub-group identifier, which identifies a sub-group of the end devices of the group to which the paging pertains, or an individual identifier, which identifies one of the end devices of the group to which the paging pertains, wherein the first message is generated based on a radio access-radio network temporary identifier (RA-RNTI) value; and
broadcast, by the communication interface, the first message in response to the generation of the first message.

10. The device of claim 9, wherein the RA-RNTI value is equal to one of a hexadecimal value of 0000 or a hexadecimal value between FFF4 and FFF9.

11. The device of claim 9, wherein the first message includes data that indicates a purpose of the paging.

12. The device of claim 9, wherein the processor further executes the instructions to:
receive, via the communication interface and from one or more of the end devices, one or more random access messages in response to the broadcast of the first message; and
transmit, via the communication interface and to the one or more of the end devices, one or more random access response messages in response to the receipt of the one or more random access messages.

13. The device of claim 9, wherein the processor further executes the instructions to:
generate, in response to a second time interval calculated by the timer, a second message that includes at least one of a sub-group identifier, which identifies a sub-group of the end devices of the group to which the paging pertains, or an individual identifier, which identifies one of the end devices of the group to which the paging pertains, wherein the second message is generated based on a RA-RNTI value and the second time interval is subsequent to the first time interval; and
broadcast, via the communication interface, the second message in response to the generation of the second message.

14. The device of claim 9, wherein the RA-RNTI value of the first message is different from the RA-RNTI value of the second message.

15. The device of claim 9, wherein the device is an evolved Node B, and the RA-RNTI value is equal to a hexadecimal value between 0001 and 003C.

16. A non-transitory, computer-readable storage medium storing instructions executable by a processor of a computational device, which when executed cause the computational device to:
- generate a paging message that includes a group identifier that identifies a group of end devices to which a paging pertains;
- broadcast the paging message in response to the generation;
- start a timer in response to the broadcast of the paging message;
- generate, in response to a first time interval calculated by the timer, a first message that includes at least one of a sub-group identifier, which identifies a sub-group of the end devices of the group to which the paging pertains, or an individual identifier, which identifies one of the end devices of the group to which the paging pertains, wherein the first message is generated based on a radio access-radio network temporary identifier (RA-RNTI) value; and
- broadcast the first message in response to the generation of the first message.

17. The non-transitory, computer-readable storage medium of claim 16, wherein the RA-RNTI value is equal to one of a hexadecimal value of 0000 or a hexadecimal value between FFF4 and FFF9.

18. The non-transitory, computer-readable storage medium of claim 16, wherein the first message includes data that indicates a purpose of the paging.

19. The non-transitory, computer-readable storage medium of claim 16, further storing instructions executable by the processor of the computational device, which when executed cause the computational device to:
- receive from one or more of the end devices, one or more random access messages in response to the broadcast of the first message; and
- transmit to the one or more of the end devices, one or more random access response messages in response to the receipt of the one or more random access messages.

20. The non-transitory, computer-readable storage medium of claim 16, further storing instructions executable by the processor of the computational device, which when executed cause the computational device to:
- generate, in response to a second time interval calculated by the timer, a second message that includes at least one of a sub-group identifier, which identifies a sub-group of the end devices of the group to which the paging pertains, or an individual identifier, which identifies one of the end devices of the group to which the paging pertains, wherein the second message is generated based on a RA-RNTI value and the second time interval is subsequent to the first time interval; and
- broadcast the second message in response to the generation of the second message.

* * * * *